United States Patent [19]

Kase

[11] Patent Number: 4,564,995
[45] Date of Patent: Jan. 21, 1986

[54] COMPOSITE MACHINE TOOL

[75] Inventor: Hiroshi Kase, Takatsuki, Japan

[73] Assignee: O-M Limited, Osaka, Japan

[21] Appl. No.: 714,055

[22] Filed: Mar. 20, 1985

Related U.S. Application Data

[63] Continuation of Ser. No. 466,869, Feb. 16, 1983, abandoned.

[30] Foreign Application Priority Data

Feb. 26, 1982 [JP] Japan ................................. 57-30832

[51] Int. Cl.⁴ .......................................... B23Q 39/02
[52] U.S. Cl. ......................................... 29/563; 29/26 A;
29/564; 29/650; 82/2 D; 82/3; 409/212
[58] Field of Search ................... 29/33 P, 27 R, 29 A, 29/27 C, 26 A, 560, 563, 564, 564.2, 564.7, 565, 566, 650; 409/202, 212, 211, 213, 217, 221, 233, 234, 235, 236, 240, 241, 158, 166, 167, 168, 169, 174; 82/2 D, 2.5, 3; 408/34, 43, 103, 129

[56] References Cited

U.S. PATENT DOCUMENTS

| 905,680 | 12/1908 | Farrier | 82/2 D X |
|---|---|---|---|
| 2,249,230 | 7/1941 | Schafer | 408/103 X |
| 2,330,529 | 9/1943 | Trosch et al. | 82/2 D |
| 2,393,696 | 1/1946 | Kraut et al. | 409/212 X |
| 2,890,298 | 6/1959 | Bullard et al. | 29/38 A X |
| 3,520,369 | 3/1971 | Hoddinott et al. | 409/211 |
| 3,587,390 | 6/1971 | Lohneis et al. | 409/167 X |
| 3,792,633 | 2/1974 | Filiper et al. | 82/25 |
| 4,090,287 | 5/1978 | Selander | 29/563 X |
| 4,097,175 | 6/1978 | Tsukizi | 29/27 C |
| 4,118,844 | 10/1978 | Matsuzaki et al. | 29/27 C |
| 4,197,769 | 4/1980 | Smith et al. | 82/3 |
| 4,209,910 | 7/1980 | Rathsack et al. | 82/2 P X |

FOREIGN PATENT DOCUMENTS

| 0090209 | 7/1980 | Japan | 408/129 |
|---|---|---|---|
| 0112753 | 8/1980 | Japan | 29/33 P |
| 107759 | 7/1982 | Japan | 29/564 |

Primary Examiner—Gil Weidenfeld
Assistant Examiner—Glenn L. Webb
Attorney, Agent, or Firm—Burgess, Ryan & Wayne

[57] ABSTRACT

A composite machine tool for metal working, provided with a pair of vertical columns. On the front and rear sides of the vertical columns, there are provided a vertical lathe and a milling machine, respectively, able to be driven and operated independently of each other. Machining by these machine tools is effected on a workpiece rested on a pallet. A pallet transfer apparatus for conveying a succession of pallets with workpieces is provided between the vertical lathe and the milling machine and between the vertical columns. When each turning operation in the vertical lathe is finished, the corresponding pallet with the workpiece rested thereon is immediately conveyed into the milling machine by the pallet transfer apparatus. The composite machine tool is particularly useful in reducing the time for conveying comparatively heavy workpieces.

2 Claims, 5 Drawing Figures

COMPOSITE MACHINE TOOL

This application is a continuation of application Ser. No. 466,869, filed Feb. 16, 1983, abandoned.

BACKGROUND OF THE INVENTION

1. Field of the Invention

The present invention relates to a composite machine tool for metal working. More particularly, the present invention relates to a composite machine tool including a vertical lathe and a machining-center type machine tool, e.g., a milling machine.

2. Description of the Prior Art

Typical composite machine tools of the prior art are usually equipped with a single turret tool post with various cutting tools. Machining of each of the cutting tools for one workpiece is operated independently of each other. With such composite machine tools, if the workpiece is heavy, consecutive lathing and milling for many workpieces is difficult and, therefore, a high efficiency of machining operation is not achieved.

Instead of the above, two or more such machine tools may be installed and utilized in combination; however, the workpieces are usually comparatively heavy. Therefore, the workpieces cannot be easily conveyed from, for example, a vertical lathe to a milling machine. Such conveyance requires considerable time. Also, the use of separate maching tools means a large size of the overall machining system and a correspondingly large floor space.

SUMMARY OF THE INVENTION

The present invention is intended to overcome the above-mentioned disadvantage of conventional machine tools by providing a composite machine tool.

According to the invention, there is provided a composite machine tool with a pair of vertical columns. On the front side of the vertical columns, a vertical lathe having a vertically and horizontally movable cutting tool is provided. On the rear side, a milling machine having rotatable cutting tools is provided. The two machine tool units can be driven and operated independently of each other.

A pallet transfer apparatus for conveying a succession of pallets with workpieces resting thereon is provided between the vertical lathe and the milling machine and between the vertical columns. The pallet transfer apparatus includes actuating bars horizontally provided between the vertical columns and an intermediate table mounted between the vertical columns and includes a drive unit to move the actuating bars back and forth to enable a smooth conveyance of a succession of pallets with workpieces.

When the machining of the workpiece in the vertical lathe is finished, the pallet holding the machined workpiece may be immediately conveyed to the milling machine through the pallet transfer apparatus for machining of the workpiece in the milling machine.

The advantages offered by the present invention are consecutive machining by the vertical lathe and milling machine, less time for conveyance of workpieces, reduced size of the overall machining system, and a correspondingly reduced size of the requisite floor space. Lathing and milling by such a composite machine tool therefore offers higher efficiency of operation in all aspects.

BREIF DESCRIPTION OF THE DRAWINGS

Further characteristics and advantages of the present invention will become apparent from the following description made with reference to the attached drawings, in which similar reference numerals and characters denote similar elements, wherein.

DESCRIPTION OF THE PREFERRED EMBODIMENTS

Figure 1:
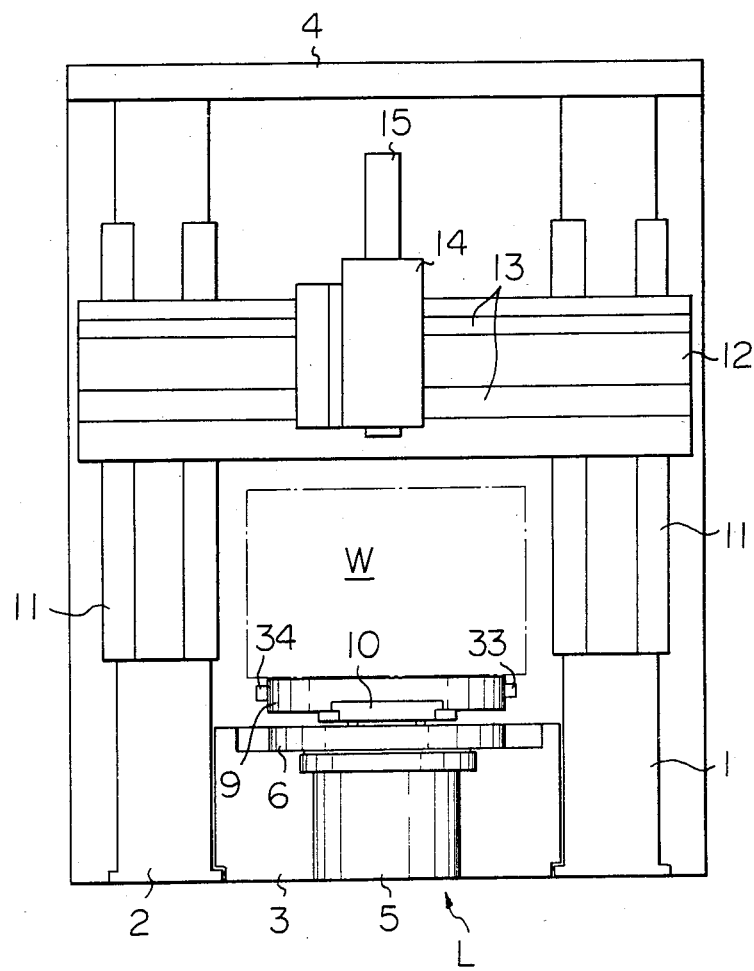
FIG. 1 is a front view of one embodiment of a composite machine tool according to the present invention.
Figure 2:
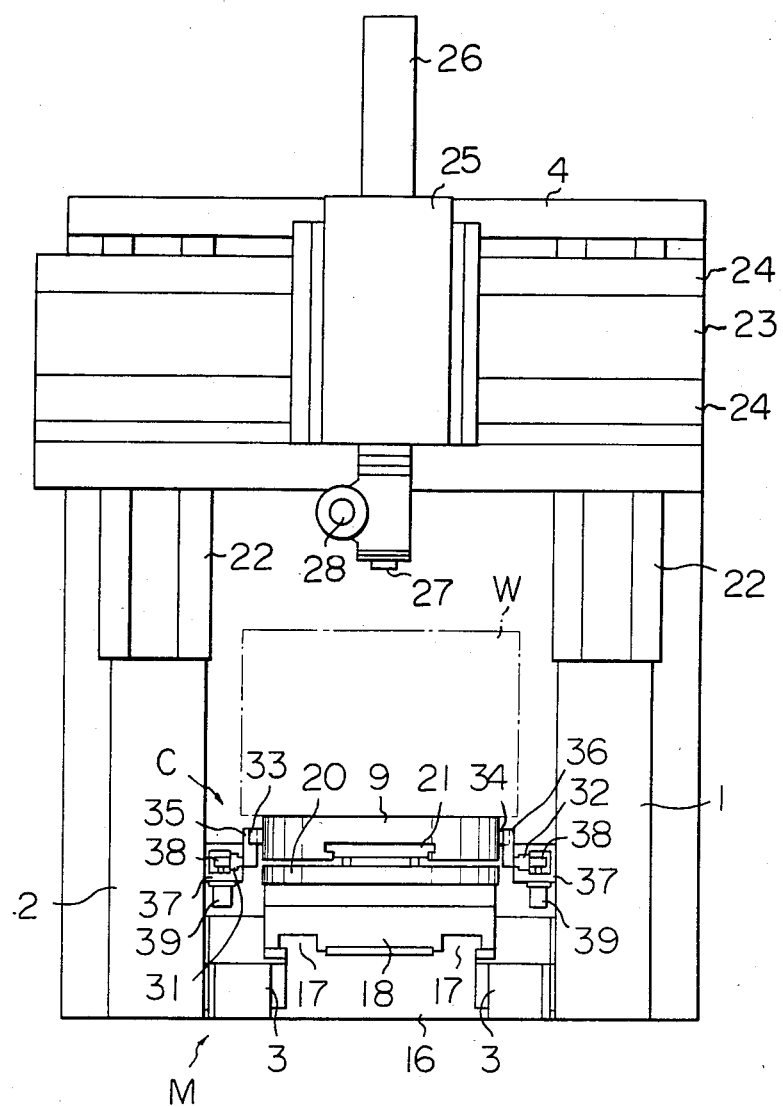
FIG. 2 is a rear view of the embodiment shown in FIG. 1.
Figure 3:
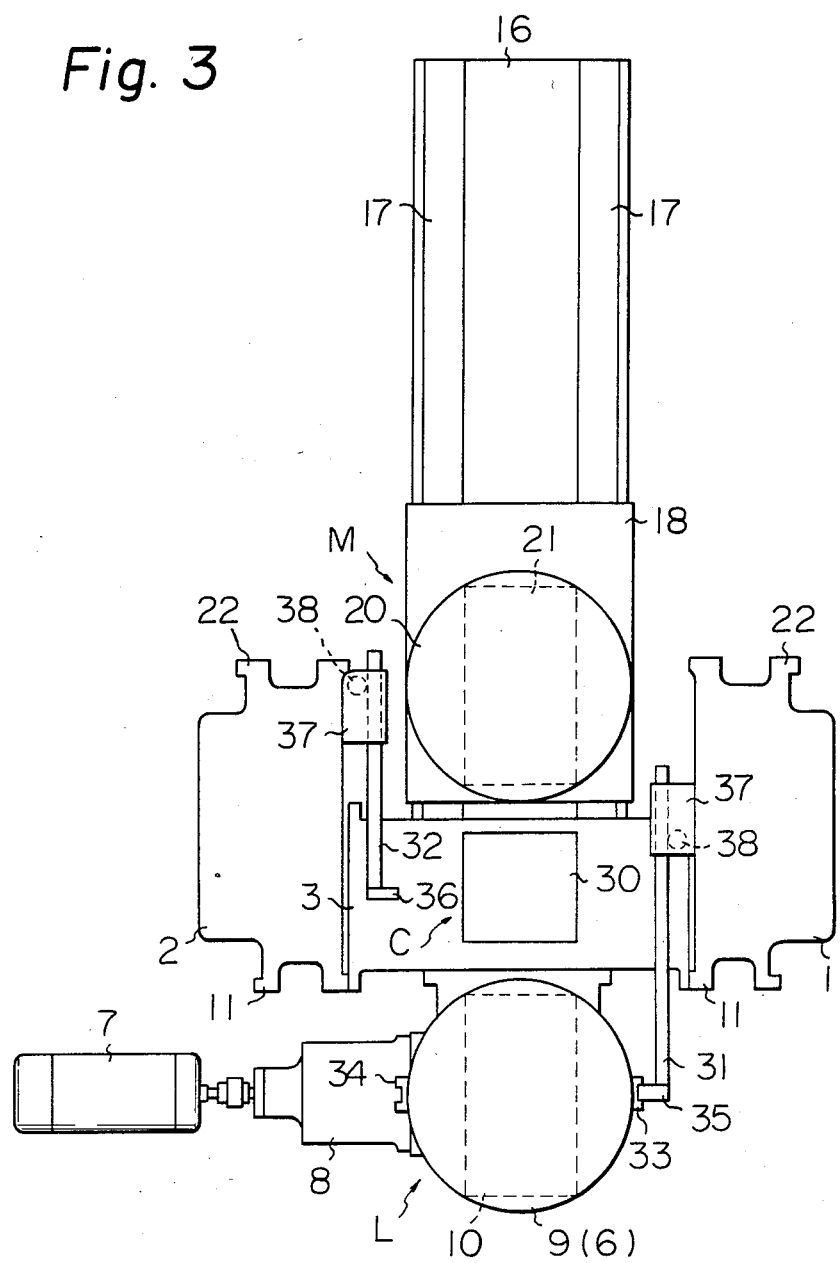
FIG. 3 is a plan view of the embodiment of FIG. 1 partly eliminated to clarify the construction.
Figure 4:
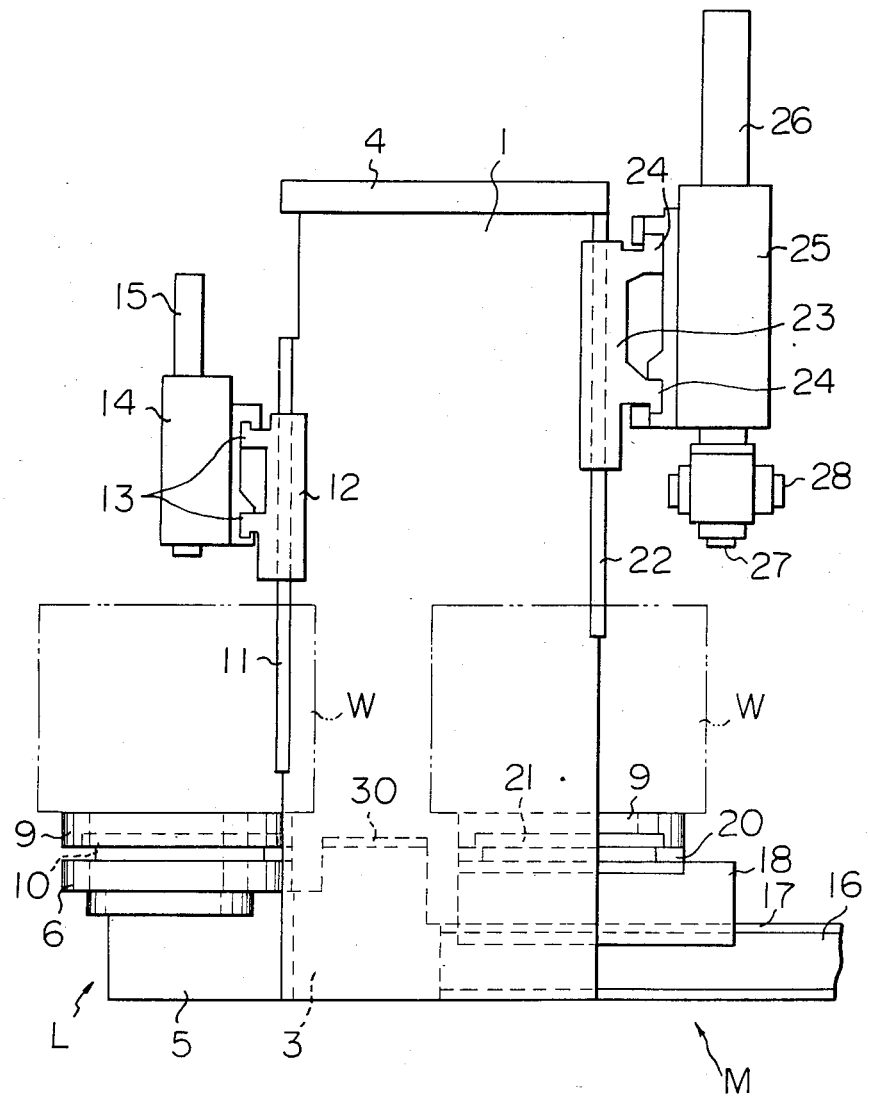
FIG. 4 is a right-hand view of the embodiment shown in FIG. 1.
Figure 5:
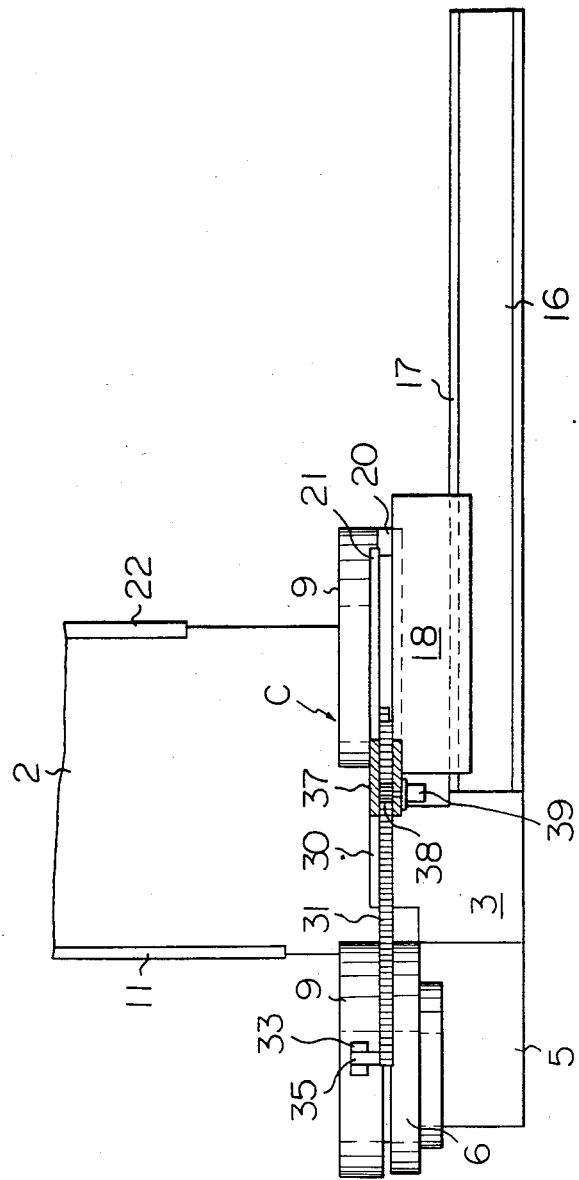
FIG. 5 is a similar view of FIG. 4 partly cut away to show the pallet transfer apparatus.

In the embodiment illustrated, reference numerals 1 and 2 denote a pair of vertical columns or uprights having substantially rectangular cross-sections along the horizontal plane. The depth of the rectangular cross-sections is considerably larger than the width thereof. The vertical columns 1 and 2 are disposed at a predetermined distance from each other. The lower and upper ends of the vertical columns 1 and 2 are firmly connected with each other by means of transversely disposed bottom and top stays 3 and 4 so as to form a rigid gate-shape construction.

On the front and rear sides of the vertical columns 1 and 2, a vertical lathe L and a machining-center type machine tool, in the case of this embodiment, a milling machine M, are respectively disposed. The vertical lathe L and the milling machine M can be driven and operated independently of each other by drive motors, one of which is shown by reference numeral 7.

The vertical lathe L includes a round rotary table 6 mounted on and rotatable about a vertical axis of a low round bed 5. The rotary table 6 can be rotated by the drive motor 7 through a gear train (not shown) constructed within a gear box 8. This gear box 8 is formed as an integral part of the round bed 5.

A pallet 9 is formed as a circular disc and has a workpiece W (previously placed thereon outside the machining area) firmly attached thereto by any suitable means. The pallet 9 with the workpiece W is mounted on the rotary table 6 by a handling unit (not shown) and is rigidly fixed thereto by a first clamping unit 10 provided on the rotary table 6.

A cross rail 12 for the vertical lathe L can be vertically moved along guide rails 11, 11 formed on the front surfaces of the columns 1 and 2. A tool post 14 having a vertical tool bar 15 extending therethough can be horizontally moved along guide rails 13, 13 formed on the surface of the cross rail 12. A cutting tool (not shown) is fixed to the lower end of the vertical tool bar 15. Thus, the cutting tool may be moved in both the vertical and horizontal directions. Machining by the vertical lathe L is effected by vertically and horizontally moving the tool post 14 so that its cutting tool contacts the workpiece W on the pallet 9 as the rotary table 6 rotates.

The milling machine M includes an elongated bed 16 disposed along the longitudinal axis of the composite machine tool and a saddle 18 slidably mounted across guide surfaces 17, 17 formed on the longitudinal upper peripheries of the bed 16. On the saddle 18, there are provided an indexing table 20 and a second clamping unit 21 mounted thereon. The indexing table 20 is rotatable about a vertical axis at a predetermined position of the saddle 18. The second clamping unit 21 is intended for rigidly fixing the pallet 9 on the indexing table 20 when the pallet 9 is conveyed onto the indexing table, as will be described later.

A cross rail 23 for the milling machine M can be vertically moved along guide rails 22, 22 formed on the rear surfaces of the vertical columns 1 and 2. Also, a tool post 25 having a vertical tool bar 26 extending therethrough can be horizontally moved along guide rails 24, 24 formed on the surface of the cross rail 23. Cutting tools (not shown) are attached to rotatable vertical and horizontal spindles 27 and 28. These spindles are provided on the lower end of the vertical tool bar 26 and are driven by a drive unit (not shown). Machining by the milling machine M is effected by moving the tool post 25 in the vertical and horizontal directions and by rotating its cutting tools to contact the workpiece W on the pallet 9.

In the above-mentioned construction, the center of the rotary table 6 of the vertical lathe L is disposed to coincide with the center line of the saddle 18 of the milling machine M in the longitudinal direction thereof. Between the vertical lathe L and the milling machine M and between the vertical columns 1 and 2, a pallet transfer apparatus C for conveying the pallet 9 with the workpiece W rested thereon is provided.

The pallet transfer apparatus C includes an intermediate table 30, first and second rack bars 31 and 32, and drive unit for the rack bars 31 and 32. The intermediate table 30 is formed in the shape of a square and is fixedly mounted on the surface of the bottom stay 3. It should be noted that the upper surfaces of the rotary table 6, the intermediate table 30, and the indexing table 20 are located at substantially the same level.

The first and second rack bars 31 and 32 are respectively provided along inside surfaces of the vertical columns 1 and 2 and horizontally extend in the longitudinal direction of the composite machine tool. The first rack bar 31 has a length extending from the side portion of the rotary table 6 to the rear portion of the intermediate table 30. The second rack bar 32 has a length extending from the side portion of the intermediate table 30 to the middle portion of the saddle 18, when said saddle is positioned most adjacent to the intermediate table 30. On the front ends of the rack bars 31 and 32 are provided turnable hook members 35 and 36, respectively, which turn with respect to the axes of the rack bars. These hook members 35 and 36 are designed to engage or disengage from socket members 33 and 34, respectively, fixed to both sides of the pallet 9 and having a U-shape cross-section. The rear portions of the rack bars 31 and 32 freely penetrate within guides 37 of the vertical columns 1 and 2 and mesh with pinions 38 and 38 rotatably provided within the vertical columns 1 and 2. Thus, the rack bars 31, 32 can be moved back and forth when the pinions 38, 38 are rotated by drive motors 39, 39.

In the operation of the composite machine tool, the workpiece W is placed on the pallet 9 outside the machining area. The pallet 9 with the workpiece W is then mounted on the rotary table of the vertical lathe L and rigidly fixed thereto by the first clamping unit 10. The rotary table 6 then starts to rotate at a predetermined speed. During the rotation, machining of the workpiece W is effected by the vertical and horizontal movement of the tool bar 15 with the cutting tool. When the machining by the vertical lathe L is finished, the first clamping unit 10 is loosened. Forward movement of the first rack bar 31 causes the right-hand hook member 35 thereof to displace toward the right side position of the pallet 9. The hook member 35 is then turned to engage with the right-hand socket member 33 of the pallet 9. In the wake of the above, the first rack bar 31 is moved back so that the pallet 9 with workpiece W is rearwardly displaced by the hook member 35. In such a case, the pallet 9 is conveyed from the rotary table 6 onto the intermediate table 30 in such a manner that a major portion of the pallet 9 is located on the rotary table 6, while a minor portion thereof is located on the intermediate table 30.

In turn, forward movement of the second rack bar 32 causes the left-hand hook member 36 thereof to displace toward the left side position of the pallet 9, now located across the rotary table 6 and the intermediate table 30. The right-hand hook member 35 is turned to disengage from the right-hand socket member 33 and the left-hand hook member 36 is turned to engage with the left-hand socket member 34. In the wake of the above, the second rack bar 32 is moved back so that the pallet 9 with workpiece W is rearwardly displaced by the hook member 36. In such a case, the pallet 9 is conveyed from the intermediate table 30 onto the indexing table 20 in such a manner that a major portion of the pallet 9 is located on the intermediate table 30, while a minor portion thereof is located on the indexing table 20, when the saddle is positioned most adjacent to the intermediate table 30.

When the pallet 9 with the workpiece W is completely conveyed onto the indexing table 20, the left-hand hook member 36 is turned to disengage from the socket member 34, and the pallet with the workpiece W rested thereon is rigidly fixed to the indexing table 20 by means of the second clamping unit 21.

After the indexing table 20, i.e., the workpiece W, is turned about the vertical axis of the saddle 18 to index the workpiece W to a predetermined position, machining of the workpiece W by the milling machine M is effected by means of the rotational movement of the cutting tools about the vertical or horizontal spindles 27 or 28, during the sliding displacement of the saddle 18. When the machining of the workpiece W by the milling machine M is finished, the second clamping unit 21 is lossened from the indexing table 20. The pallet 9 with the machined workpiece W is then lowered onto the floor by any suitable handling unit.

The invention has been described in detail with reference to a preferred embodiment thereof, but it will be understood that reasonable variations and modifications are possible without departing from the spirit and scope of the invention. For example, if some increase in space is allowable, the first and second rack bars 31 and 32 can be made as two pairs of first and second rack bars 31, 31 and 32, 32. Also hydraulic cylinders and piston rods can be utilized instead of the first and second rack bars.

I claim:
1. A composite machine tool comprising:
   a pair of vertical columns disposed at a predetermined distance from each other;
   a stay disposed between lower ends of said vertical columns and connected therebetween;

an independently operable lathe having a rotary table and a movable cutting tool, provided on front sides of said vertical columns;

a first cross rail vertically movable along the front surfaces of said vertical columns and provided with a tool post for the lathe;

an independently operable machining center type machine tool having an indexing table and cutting tools, provided on the rear sides of said vertical columns;

a second cross rail vertically movable along the rear surfaces of said vertical columns and provided with a tool post for the machining center type machine tool; and a pallet transfer apparatus disposed between the lathe and machining center type machine tool and between the vertical columns for conveying a succession of pallets with workpieces thereon, said transfer apparatus comprising:

an intermediate table fixedly mounted on said stay, actuating bars horizontally disposed between said intermediate table and inside surfaces of said vertical columns, and movable along the longitudinal axis of the composite machine tool;

upper surfaces of the rotary table, intermediate table, and indexing table being located at substantially the same level;

turnable hook members provided on the front ends of said acutating bars, said hook members being adopted to be engaged or disengaged from socket members fixed to opposite sides of said pallet; and drive means for driving said bars back and forth, wherein engagement between said hook members and socket members on each pallet and succeeding movement of said actuating bars after the machining by the lathe for the workpiece on the pallet is finished, causing the pallet and the workpiece thereon to be conveyed from the rotary table of the lathe to the intermediate table between said columns, and thereafter from the interemdiate table to the indexing table of the machining center machine tool.

2. A composite machine tool for processing workpieces disposed on corresponding pallets each pallet having socket members affixed to the sides thereof, said machine tool comprising:

a vertical lathe for performing a first manufacturing operation, said lathe being disposed in front of a pair of columns;

a machining center type machine tool with rotatable tools for performing a second manufacturing operation, said tool being disposed behind said columns; and a pallet changing apparatus disposed between said columns for conveying workpieces disposed on said pallets subjected to the first manufacturing operation toward the machining tool for the second manufacturing operation, said pallet changing apparatus comprising:

an intermediate table mounted between the columns;

actuating bars horizontally disposed inside surfaces of said columns; and drive means for driving said actuating bars back and forth;

each of said actuating bars having hook members on the front end thereof for engaging or disengaging from socket members fixed to both sides of a corresponding one of said pallets, wherein engagement between said hook members and socket members and succeeding backward movement of said actuating bars causes the conveying of the pallet from a rotary table of the vertical lathe to an indexing table of the machine tool for the second manufacturing operation, said pallet being so conveyed via the intermediate table.

* * * * *